United States Patent
Alexander et al.

(10) Patent No.: US 9,780,988 B2
(45) Date of Patent: Oct. 3, 2017

(54) SYSTEMS AND METHODS FOR WIRELESS CLOCK SYNCHRONIZATION

(71) Applicant: Ixia, Calabasas, CA (US)

(72) Inventors: Thomas Alexander, Mulino, OR (US); David Jennings Wicker, Hillsboro, OR (US)

(73) Assignee: Ixia, Calabasas, CA (US)

( * ) Notice: Subject to any disclaimer, the term of this patent is extended or adjusted under 35 U.S.C. 154(b) by 158 days.

(21) Appl. No.: 14/058,153

(22) Filed: Oct. 18, 2013

(65) Prior Publication Data

US 2015/0110231 A1    Apr. 23, 2015

(51) Int. Cl.
*H04L 27/26* (2006.01)

(52) U.S. Cl.
CPC ...... *H04L 27/2657* (2013.01); *H04L 27/2662* (2013.01); *H04L 27/2675* (2013.01); *H04L 27/2688* (2013.01); *H04L 27/2602* (2013.01)

(58) Field of Classification Search
CPC .................................. H04L 7/04; H04L 7/033
USPC .................................................. 375/362, 354
See application file for complete search history.

(56) References Cited

U.S. PATENT DOCUMENTS

| | | | | |
|---|---|---|---|---|
| 5,343,498 A * | 8/1994 | Toy | .................. | H04L 7/042 370/337 |
| 2007/0076822 A1* | 4/2007 | Miller et al. | .................. | 375/327 |
| 2007/0156030 A1* | 7/2007 | Richardson | .......... | A61B 5/0006 600/300 |
| 2009/0190675 A1* | 7/2009 | Ling et al. | .................. | 375/260 |
| 2012/0235721 A1* | 9/2012 | Booth | .................. | H03L 7/091 327/159 |

OTHER PUBLICATIONS

"IEEE Standard for Information technology—Telecommunications and information exchange between systems Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz," IEEE, IEEE Std 802.11ac™—2013, 425 pgs. (2013).

* cited by examiner

*Primary Examiner* — Kevin M Burd
(74) *Attorney, Agent, or Firm* — Jenkins, Wilson, Taylor & Hunt, P.A.

(57) ABSTRACT

Systems and methods are disclosed herein to provide improved clock synchronization between wireless data communication transmitters and receivers, including Orthogonal Frequency Division Multiplexing (OFDM) communication systems. In accordance with one or more embodiments, a clock synchronization system is disclosed that includes an adaptive threshold function operative in conjunction with a synchronizer that adjusts the frequency and phase of a receive clock oscillator. Such a synchronization system may offer improved capabilities such as resistance to radio frequency (RF) channel impairments and noise, rejection of mis-decoded clock synchronization signals, and handling of multiple transmitters.

17 Claims, 3 Drawing Sheets

SYSTEMS AND METHODS FOR WIRELESS CLOCK SYNCHRONIZATION

TECHNICAL FIELD

The subject matter described herein relates generally to wireless data communication systems; and more particularly to systems and methods for establishing and maintaining synchronization of clock signals in wireless data communication systems, including but not limited to orthogonal frequency division modulation wireless communication systems.

Wireless data communications devices, systems and networks face increasing need for higher data rates and the ability to support increased data traffic. Supporting high data bandwidths can only be accomplished by utilizing a large channel bandwidth (relative to the radio carrier frequency). However, the use of a high channel bandwidth is rendered difficult due to the nature of the radio frequency (RF) propagation channel. Noise and multipath fading result in substantial reductions in signal to noise ratio (SNR) at these large channel bandwidths. In particular multipath fading results in inter-symbol interference that renders high-speed data traffic difficult or impossible to transmit over commonly achievable RF channels using standard digital modulation techniques. Further, with high channel bandwidths the RF channel can no longer be treated as frequency flat, rendering standard modulation techniques difficult or impossible. Manufacturers and users therefore seek new and advanced modulation techniques that can facilitate increased data bandwidths for RF communication.

Orthogonal Frequency Division Multiplexing (OFDM) modulation is now in widespread use, as this modulation method offers a high degree of immunity to noise and multipath fading. In particular, OFDM reduces and eliminates inter-symbol interference by increasing the symbol period and interposing a cyclic prefix without decreasing the overall data rate. OFDM further addresses the problems of frequency variant channels by dividing up a wide RF channel into subchannels or subcarriers such that the subchannels are individually frequency flat and can be modulated with normal techniques. Therefore, OFDM modulation is commonly chosen for modern high-bandwidth wireless links.

Unfortunately, OFDM systems are very sensitive to frequency and phase offsets between the receiver and transmitter, and mandate an extremely high degree of frequency synchronization and phase alignment to be continuously maintained while wireless data transmission is being performed. In particular, the local clock (carrier) oscillators used at the receiver and transmitter must be closely phase locked, and the symbol sampling clocks must likewise be phase locked. Failure to accomplish this to the required degree of accuracy results in demodulation errors and consequent bit errors.

A carrier frequency offset, which is a frequency difference between the receive and transmit local oscillators, will cause all of the subcarriers to experience the same frequency offset. This frequency offset in turn will cause the received data constellation on each subcarrier to rotate at a constant rate, resulting in inter-subcarrier interference and demodulation errors.

A carrier phase offset, which is a phase difference between the receive and transmit local oscillators, will cause the receive carrier to be misaligned relative to the incoming symbol boundaries, and in turn will cause a static rotation of the constellation. This is normally easily corrected unless the phase offset varies substantially over time.

A sampling frequency offset, which is a situation in which the receive and transmit sampling signals are not aligned, will cause the constellation on each subcarrier to slowly drift from symbol to symbol during the reception of a packet. This situation is normally avoided entirely by generating the sampling signals as a fixed fraction of the RF carrier (or clock) oscillators. The problem therefore reduces to maintaining accurate frequency synchronization between the receive and transmit local oscillators.

It will be appreciated that even small frequency offset errors relative to the carrier center frequency can cause significant issues when dealing with advanced modulation techniques such as Quadrature Amplitude Modulation (QAM). To consider an exemplary instance, a relative frequency error of 5 kHz between receive and transmit local oscillators may be very small compared to a 320 MHz carrier frequency. Over an exemplary OFDM symbol period of 4 microseconds, this exemplary error results in a constellation rotation of 0.125 radians from the start to end of the symbol. With Binary Phase Shift Keying (BPSK) modulation, the constellation points are 3.141 radians apart, and a 0.125 radian rotation does not significantly interfere with the demodulation process. However, with 16 QAM modulation, adjacent constellation points are separated by approximately 0.1 radians, and it is apparent that a 0.125 radian rotation from the start to the end of the symbol may have a significant adverse effect. It will be apparent that the effects of this exemplary small frequency error will be even more deleterious with 64 QAM or 256 QAM modulation, which therefore will require extremely precise frequency tracking and synchronization between the receive and transmit clock oscillators for successful demodulation.

To facilitate such synchronization, special synchronization signals may be transmitted at known times so that the receiver may use these signals to frequency and phase lock its clock oscillator with that of the transmitter. In the exemplary instance of IEEE 802.11 wireless Local Area Networks (WLANs), these synchronization signals may be referred to as the Short Training Field (STF), the Long Training Field (LTF) and the pilots. The training fields may contain sequences of specially selected and well-known data symbols that are decoded by the receiver, and may make it simple to obtain an accurate estimate of the clock phase offset between the receiver and transmitter local oscillators. It will be apparent that measurement of the clock phase offset enables synchronization of the receive clock oscillator to the transmit clock oscillator.

With reference to FIG. 1, an exemplary OFDM wireless packet 101 is shown, consisting of preamble 102 containing STF 103 and LTF 104; data symbols 105; and pilot symbols 106. STF 103 and LTF 104 may be transmitted within preamble 102 at the start of each new packet 101 sent from transmitter to receiver. As will be observed, STF 103 and LTF 104 occupy all of the subcarriers during their symbol periods and comprise multiple sequential symbols. However, to reduce the amount of overhead and increase the data capacity of the packet, pilot symbols 106 may be sparsely arranged over the packet, and further may only occupy one subcarrier for one symbol period.

Use of the STF and LTF may enable the receive clock oscillator to be rapidly synchronized with the transmit clock oscillator at the start of the packet being received. This may enable the symbols present at the start of the packet to be decoded with high accuracy. However, as time passes the receive clock oscillator may experience a frequency drift away from the transmit clock oscillator. This frequency drift is caused by naturally occurring random perturbations of the oscillators and is unavoidable. Therefore as reception of the incoming packet progresses, the receive and transmit clock oscillators may drift apart in frequency. This may cause decoding problems with large packets containing many symbols; symbols located towards the end of the packet may be decoded with less accuracy compared to those at the beginning of the packet. If the drift is sufficiently large, the symbols towards the end of the packet may in fact not be decoded correctly at all, and may cause the entire packet to have to be discarded due to errors.

To address this defect, pilots 106 may be introduced into the OFDM modulation process and used for frequency synchronization. Pilots are specific symbol/subcarrier combinations that do not carry data, but may instead be set to known values similar to the STF and LTF. Pilots may therefore provide a-priori known reference points scattered throughout the incoming packets containing well-known symbols. The receiver may then decode these pilots to determine their symbol boundaries, and may then use this information to recalculate the phase offset between receive and transmit oscillators. The phase offset may then be used to correct and re-synchronize the receive oscillator to the transmit oscillator. As the pilots are transmitted periodically throughout the packet, they may assist in keeping the receive and transmit oscillators synchronized throughout the length of the packet, and may overcome the clock drift problem.

STF 103 and LTF 104 cover multiple sequential symbols and span all subcarriers, thereby providing an estimate of clock offset error across the entire channel bandwidth as well compensating for the effects of multipath and channel noise. However, pilot symbols 106 may be relatively sparse, and further each pilot symbol may only occupy one subcarrier for one symbol period. The estimate of clock offset error that is obtained from pilot symbols 106 may therefore be much less accurate than that obtained from STF 103 and LTF 104. It may further be observed that in the presence of real RF channels that are time-varying and noisy, pilot symbols 106 may provide poor estimates of clock offset errors. This may even further be exacerbated by the relative sparsity of pilot symbols 106; as a consequence, the amount of filtering that can be applied to the pilots is far less than that possible with STF 103 and LTF 104.

For these reasons, it may be inferred that the current practice of blindly using pilots 106 to modify and update the clock offset error measurements calculated from STF 103 and LTF 104 may result in excessive clock jitter and offset noise. This may cause a formerly good clock offset error estimate obtained at the beginning of packet 101 to become bad over time in the presence of a bad RF channel. A bad RF channel may in fact cause pilot-calculated receive clock offset variations that exceed the normal uncorrected drift between receive and transmit clock oscillators. However, in the presence of a good RF channel, pilot-calculated clock offset errors may reduce the drift and improve demodulation.

Current wireless synchronization techniques therefore suffer from serious shortcomings. There is hence a need for improved clock oscillator synchronization techniques for OFDM wireless data communication systems. A synchronization technique that tolerates bad or noisy RF channels between a transmitter and a receiver may be desirable. It may be preferable for such a synchronization technique to determine when the clock offset error estimates may be affected by such bad RF channels. Finally, it may further be preferable for an improved synchronization technique to provide a means for assessing drift between different transmit clock oscillators.

SUMMARY

Systems and methods are disclosed herein that may provide improved techniques for synchronization of receive and transmit clock oscillators in wireless data communication devices, systems and networks. Such techniques may enable more accurate frequency and phase alignment of these oscillators, and may also render the alignment more tolerant of RF channel impairments and noise. The systems and methods disclosed may further enable the improved comparison of the frequency drift of multiple transmit clock oscillators.

In accordance with an aspect of one embodiment, a clock synchronization system is disclosed that may be operative to achieve and maintain accurate clock synchronization over the duration of OFDM wireless data packets being received by a wireless data receiver. The system may contain: clock offset detection functions to calculate the clock frequency offset based on the packet preamble; clock offset detection functions to calculate the clock frequency offset based on the pilots; averaging functions to process the calculated offsets; adaptive threshold functions to remove unwanted clock offset values; and synchronization functions to bring the receive clock oscillator into alignment with the transmit clock oscillator.

Advantageously, the clock synchronization system may adjust the threshold function to eliminate offset error values that would cause jitter or variations beyond the tolerable value of clock drift, while still retaining offset values that would improve the level of synchronization.

Advantageously, the clock synchronization system may adjust the threshold function according to a determined quality of the RF channel, enabling the system to eliminate offset values that are affected by channel impairments and noise.

Advantageously, the clock synchronization system may adjust the threshold function selectively to adapt the threshold according to the specific transmitter that is sending wireless data packets to the receiver, enabling the system to maintain synchronization for different transmitter/receiver pairs.

Advantageously, the clock synchronization system may allow the comparison of the relative quality of different transmit clock oscillators.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The detailed description herein of the features and embodiments are best understood when taken in conjunction with the accompanying drawings, wherein.

It should be understood that like reference numerals are used to identify like elements illustrated in one or more of the above drawings.

DETAILED DESCRIPTION

Figure 2:
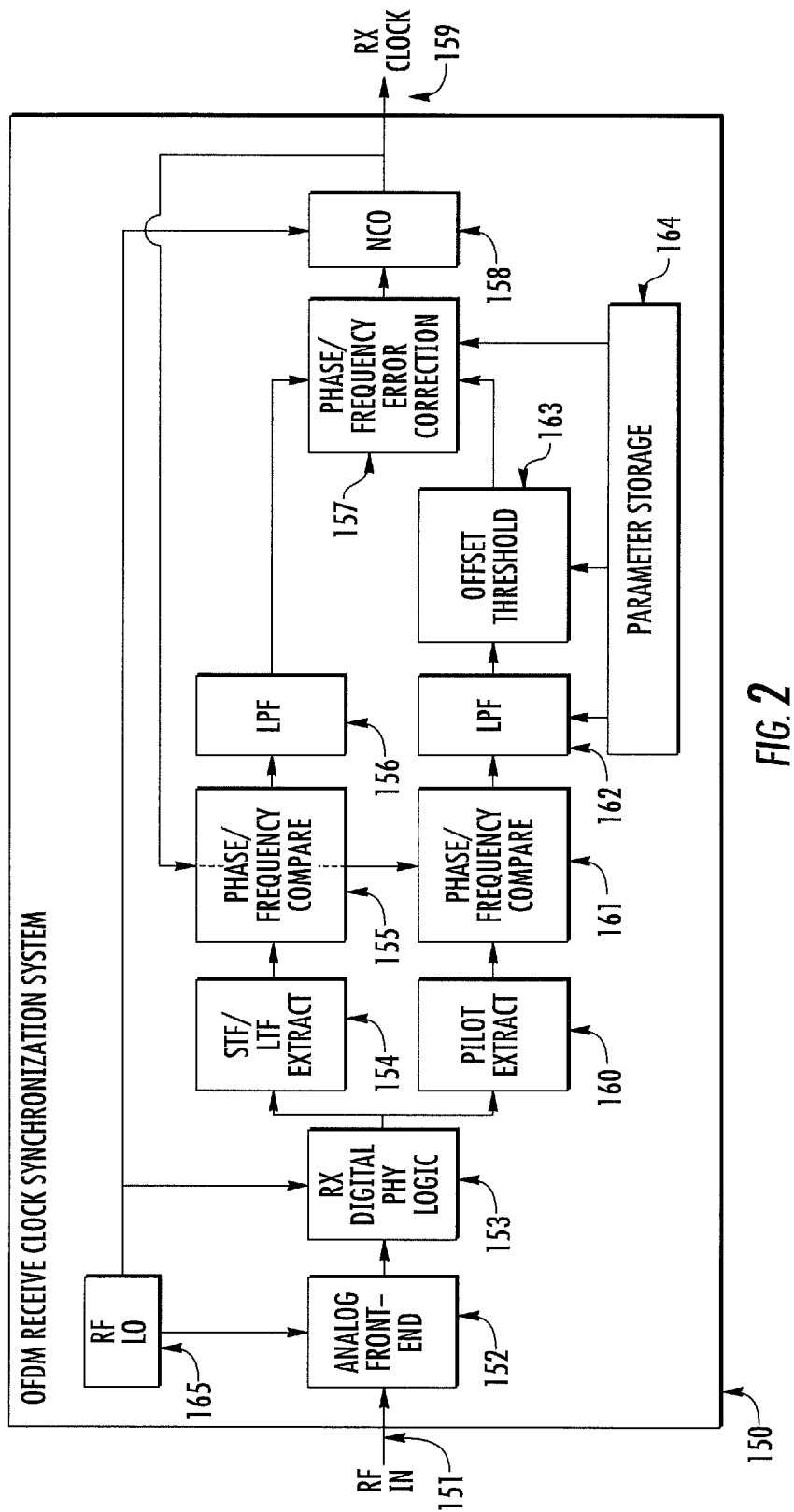
FIG. 2 provides an exemplary aspect of a clock synchronization system.

With reference to FIG. 2, an aspect of an embodiment of a wireless clock synchronization system 150 is shown, that accepts RF signals 151 and outputs a receive clock signal 159 that is synchronized to the transmitting clock signal or signals. Such a system may comprise: analog front end (AFE) 152 to amplify and convert RF signals 151 to digital baseband signals; RX digital PHY (physical layer) logic 153 to demodulate and process these baseband signals to form packets; STF/LTF extraction function 154 to identify and extract the STF and LTF segments within packet preambles; phase/frequency comparison logic 155 to compare the reference STF and LTF signals against a local receive clock oscillator, and may produce frequency and phase offset estimates; low pass filter (LPF) 156 to filter and smooth offset estimates; phase/frequency error correction function 157 to convert filtered offset estimates into error correction signals; and numerically controlled oscillator (NCO) 158 that may generate the local receive clock oscillator signal and further may accept these error correction signals.

In operation, a transmitting station may generate RF signal 151 that is processed and converted to received packets by AFE 152 and digital PHY 153. The STF/LTF extracted from these packets provides accurate estimates of the frequency and phase of the transmit clock oscillator; by comparing these estimates with the local receive clock oscillator generated by NCO 158, the frequency and phase offset between the receive and transmit clock oscillator can be determined to a high level of precision. Residual noise and jitter may be removed by LPF 156 before the offsets are converted into correction signals, which may then used to modify the frequency and phase of NCO 158 and bring it into synchronization with the transmit clock oscillator.

Figure 1:
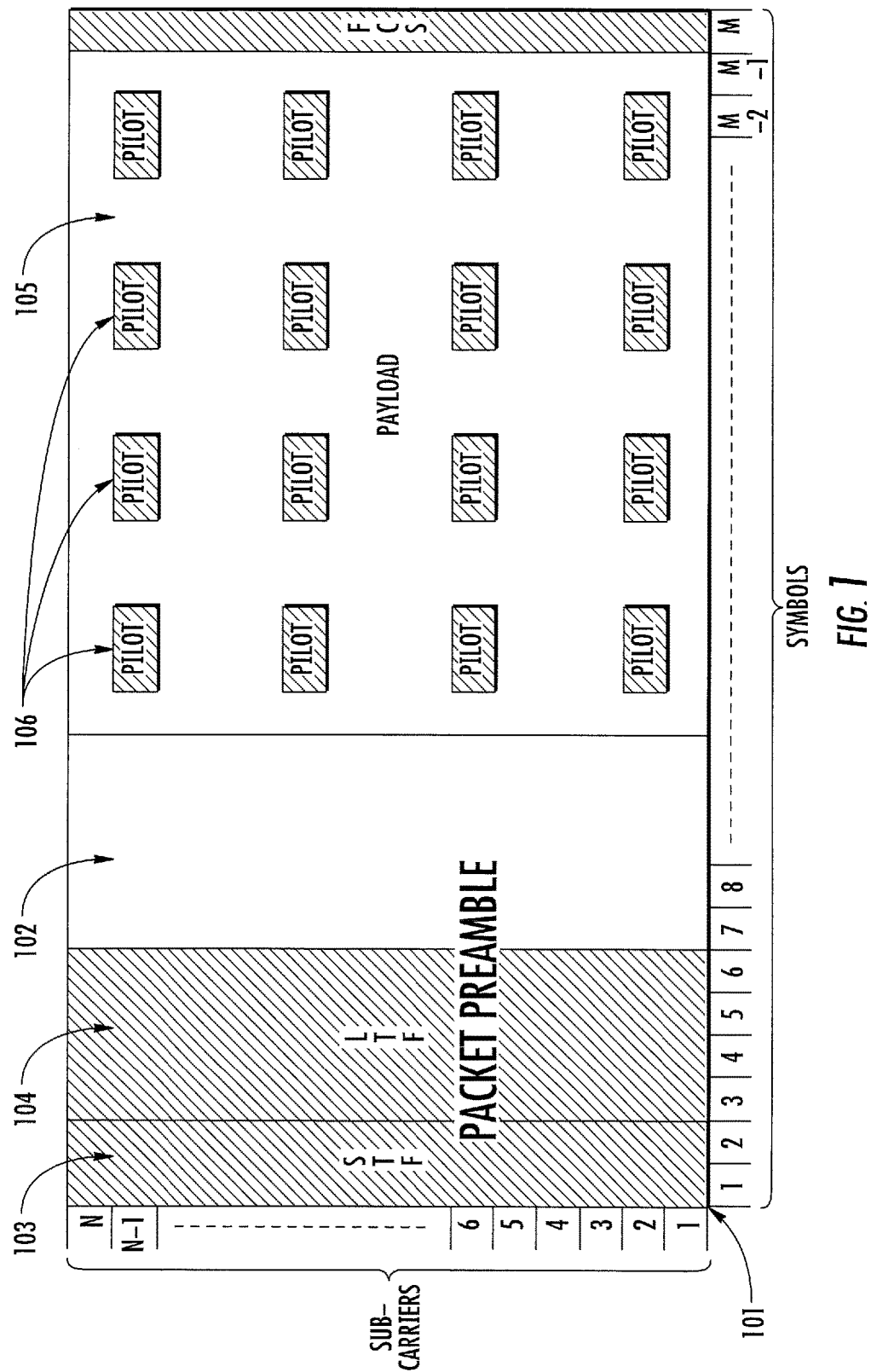
FIG. 1 shows a simplified representation of an OFDM packet and the fields therein that may be used for clock synchronization.

Once synchronized at the beginning of a frame, NCO 158 may, by virtue of its natural stability, remain in synchronization for a period of time. However, over the course of a long received packet, NCO 158 may begin to drift in frequency or phase relative to the transmit clock oscillator. To maintain synchronization, signals may be embedded within the packet, such as the pilot signals depicted in FIG. 1. To facilitate the use of these signals for synchronization, clock synchronization system 150 may further comprise: pilot extract function 160 to extract pilot signals; phase/frequency comparison logic 161 to compare the pilot signal phase against that of NCO 158 and generate offset estimates; LPF 162 to filter and smooth the offset estimates; offset threshold function 163, that may compare the offset estimates against a pre-set threshold, and may further make a decision as to whether to send the offset estimates to phase/frequency error correction function 157 for application to NCO 158.

As previously noted, in the presence of time-varying RF channels and noisy pilot signals, the offset estimates obtained from LPF 162 may contain large amounts of noise and jitter. Direct application of noisy offset estimates to NCO 158 may actually induce a much larger frequency and phase jitter between receive and transmit clock oscillators than the natural drift between them. However, failure to apply the offset estimates in time may result in the drift causing an excessive amount of frequency difference between the receive and transmit clock oscillators, which may in turn prevent the received signals from being decoded. Therefore, it may be advantageous to control the application of offset estimates derived from pilot signals.

Offset threshold function 163 may be used to implement such a controlled application of pilot-derived offset calculations. Prior to applying a pilot-derived offset estimates to NCO 158, the offset estimates may be compared to a pre-set threshold. If the offset estimates are below the threshold, this may indicate that the natural frequency drift has not yet reached a point where it exceeds the channel impairment and noise effect; in this case, it may be preferable to discard the offset estimates and leave NCO 158 free-running. However, if the offset estimates are above the threshold, this may indicate that the impairment due to natural drift has exceeded the impairments due to the channel and noise; in this case, it may be necessary to begin applying the offset estimates to correct NCO 158. Once the correction process has started, however, it may preferably be continued until the end of the packet.

A further step of filtering may be performed to remove outliers from the offset calculation prior to passing them through LPF 162. This may be done, for example, by calculating the running mean and standard deviation over the set of offsets for the pilot signals, and then discarding all offsets that lie outside of the range established by the standard deviation.

The offset threshold may be determined from the range of the filtered offsets calculated from different pilot signals. If the RF channel has a low level of impairments and noise, it may be observed that the filtered offsets lie in a small range, indicating that the timing estimates obtained from the pilot signals may be fairly accurate. In this case the threshold may be set low. If on the other hand the RF channel has a high level of impairments and noise, it may be seen that the filtered offsets are widely distributed, and this may indicate that the offset threshold should be set high.

It will be appreciated that phase/frequency comparison logic 155, LPF 156, error correction function 157, and NCO 158 may be regarded as a classical phase-locked loop (PLL) that is synchronized with the incoming received packet transmit clock oscillator signal. The reference signal for this primary PLL may be an accurate representation of the transmit clock oscillator signal, which may be derived from the STF/LTF pattern within the packet preamble. It will further be appreciated that phase/frequency comparison logic 161, LPF 162, offset threshold function 163, error correction function 157 and NCO 158 may together form a secondary PLL, the reference signal for which may be a more noisy and less accurate representation of the transmit clock oscillator signal, which may be derived from the pilot signals within the packet payload. As such, well-known PLL theory may be applied to determine the characteristics of both of the PLL functions. In particular, the parameters to be used for controlling the secondary PLL may be derived from the properties of the input signal and the desired behavior of the synchronization system using PLL theory, and may then be stored in parameter storage 162. These parameters may be different for different packet sources (i.e., different combinations of transmitters and RF channels), and therefore parameter storage 162 may store a different sets of PLL function characteristics corresponding to different packet sources.

It will also be apparent that the threshold values applied by offset threshold function 163 are dependent on the magnitude of the relative drift between the receive and transmit clock oscillators, as well as the level of impairments and noise present in the channel. This may also be true of the other PLL parameters, such as the filter functions performed in LPF 162, as well as the gain of the phase/frequency error correction function 157. It is further observed that these parameters may be different for each pair of transmitter and receiver. In the case of multiple transmitters sending wireless data packets to a receiver, therefore, it may be advantageous to utilize different sets of such parameters for packets received from different transmitters. In another aspect of an embodiment, multiple sets of parameters may be stored in parameter storage 164; upon reception of a packet, the source (transmitter) may be identified and the appropriate set of parameters may be retrieved and supplied to LPF 162, offset threshold function 163 and phase/frequency error correction function 157. This may render the offset correction process selective according to the specific transmitter of a packet.

It is understood that one or more of functions 155-164 can be regarded as a feedback control function for modifying the frequency and phase of NCO 158. It should also be noted that the components illustrated in FIG. 2 can be implemented in any wireless system with a wireless receiver in which synchronization of the transmit and receive clocks is desired. For example, the receive clock synchronization system illustrated in FIG. 2 may be a component of a network equipment test device that tests wireless networking equipment, such as IEEE 802.11ac equipment. In another example, the receive clock synchronization system illustrated in FIG. 2 can be a component of an IEEE 802.11 ac wireless access point or of a device, such as computer or a mobile phone that communicates with such an access point. It is also understood that all of the components illustrated in FIG. 2 may be implemented by at least one processor, where a processor may include hardware that performs the indicated functions.

Figure 3:
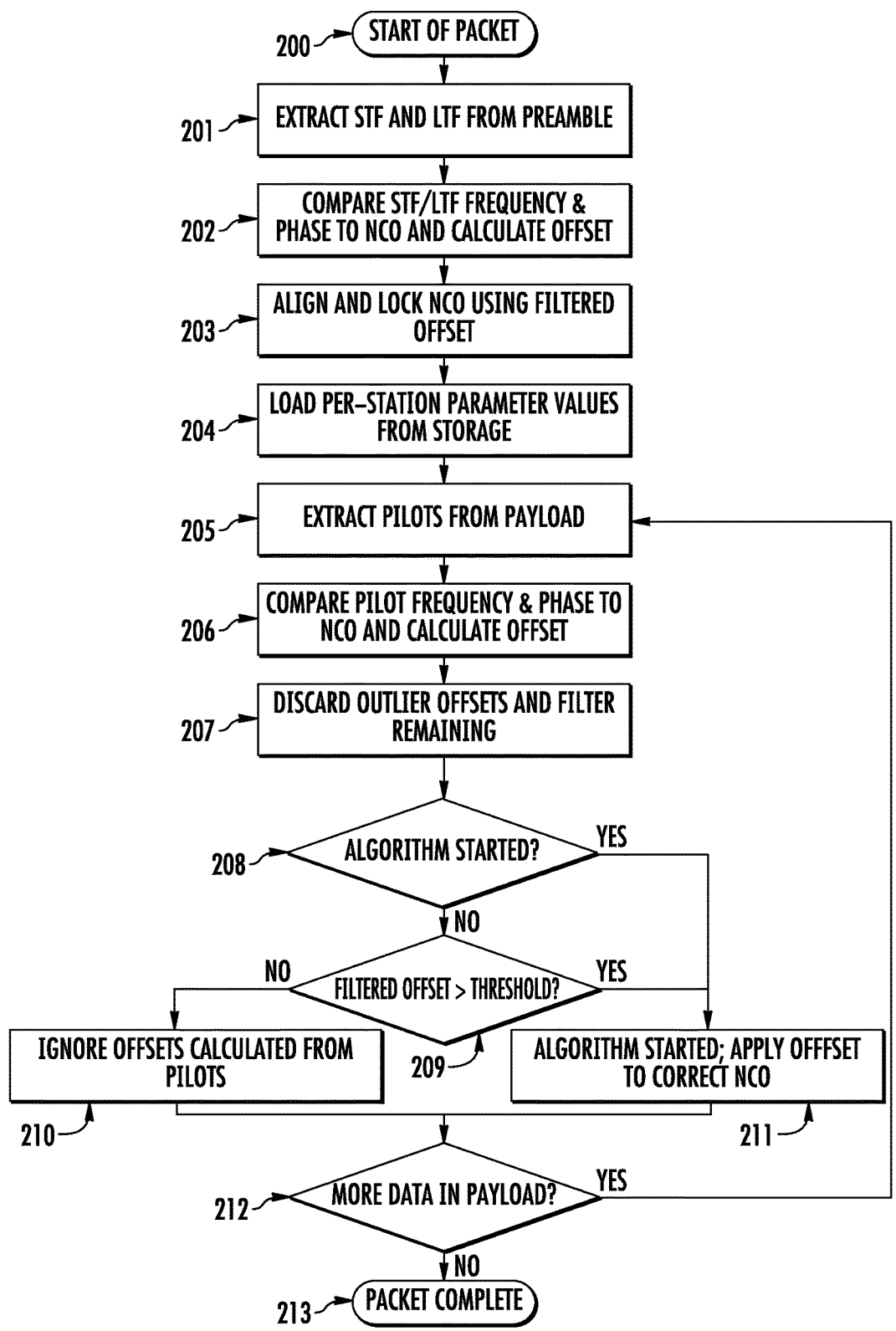
FIG. 3 depicts an illustrative flow chart of one possible method of determining clock frequency offset correction from pilots.

Turning now to FIG. 3, a flowchart of an exemplary procedure for performing a controlled and selective offset correction process is depicted. Such a procedure may follow the steps of:
 a) At step 200, beginning the process upon the commencement of reception of a packet;
 b) At step 201, decoding and extracting the STF and LTF from the preamble of the packet;
 c) At step 202, comparing the STF and LTF symbol timing to the NCO signal in frequency and phase, and calculating an offset between the symbol timing and the NCO timing;
 d) At step 203, aligning and locking the NCO to transmit clock oscillator using the offsets calculated from the STF and LTF;
 e) At step 204, obtaining the PLL parameters required by LPF 162, offset threshold function 163, and phase/frequency error correction function 157 from parameter storage 164, which may further include the step of using source information contained within the packet to identify the transmitter and select an appropriate set of parameters to retrieve;
 f) At step 205, extracting the pilot signals from the payload;
 g) At step 206, comparing the pilot symbol timing to the NCO signal and calculating an offset;
 h) At step 207, removing outliers from the offsets and filtering the remaining offset values;
 i) At step 208, checking if the threshold algorithm had started, and, if so, proceeding directly to step 211 to apply the pilot-calculated offset to the NCO;
 j) At step 209, as the algorithm has not yet started, checking if the filtered offset is greater than the threshold;
 k) At step 210, if the filtered offset is less than the threshold, discarding the pilot-calculated offsets and not starting the algorithm;
 l) At step 211, if the filtered offset is greater than the threshold, indicating that the algorithm has started (or is being continued), and applying the pilot-calculated offsets to correct the NCO;
 m) At step 212, checking if more data is present in the payload, and, if so, returning to step 205 to continue the process of extracting and processing pilot signals; and
 j) At step 213, terminating the process at the completion of reception of the packet.

In another aspect of an embodiment, the relative clock drifts between multiple transmitters may be assessed at a single receiver from the thresholds being utilized in the synchronization procedure. A transmitter with a higher clock drift level relative to another transmitter with a lower clock drift level may require a lower threshold level to be used for controlling the level at which the algorithm is triggered, for example at step 209 in FIG. 3. Therefore, by simply comparing the thresholds stored for different transmitters with each other, a rapid determination of relative clock drift may be made, which in turn may enable the assessment of the quality of the clock oscillator in the transmitter.

Thus, one aspect of the subject matter described herein may include a method of analyzing the relative quality of a plurality of transmit oscillators within a corresponding plurality of wireless Devices Under Test (DUTs). The devices under test may include any devices with wireless transmitters with which it may be desirable to synchronize the oscillator of a wireless receiver. For example, the DUTs may be wireless access points, such as IEEE 802.11 access points, or wireless basestations, such as LTE evolved node Bs (e-node Bs). The method may include receiving a wireless signal from each of the DUTs, and, for each of the wireless signals received, processing a first signal and a plurality of second signals. For example, the first and second signals may be received from each DUT and sent to one or more synchronization circuits, such as that illustrated in FIG. 2 for local oscillator synchronization. The first signals may be the STF and LTF signals described above, and the second signals may be the pilots. The method further includes initially synchronizing an oscillator to the first signal, and then calculating a plurality of offsets between the output of the oscillator and the second signals. For example, a local oscillator of a receiver may be initially synchronized with the STF and LTF, as described above, the synchronized output of the local oscillator may be compared to each of the pilots, and a timing offset between the synchronized local oscillator output and each of the pilots may be calculated.

The method further includes calculating a statistical parameter over the offsets. For example, the statistical parameter may be the average of all of the offsets for the pilots for a given DUT. The method further includes calculating a threshold according to the statistical parameter. For example, a threshold offset value may be set to the calculated average offset. The method further includes comparing the offsets with the threshold; and synchronizing the oscillator to the second signal if any of the offsets exceeds the threshold, where the threshold is used as a quality metric for the corresponding one of the transmit oscillators. For example, if the offset for a pilot for a given DUT is greater than the average offset for the DUT, the oscillator may be synchronized with the pilot. If the offset for a pilot for a given DUT is less than or equal to the average offset, the method may include refraining from synchronizing the oscillator with the pilot.

The average offset may be used as a quality metric for a given DUT. For example, the average offset may be used to compare frequency drifts of different transmit oscillators. To compare the frequency drifts, the average offset calculated for each DUT may be compared to the average offset across all of the DUTs. In one example, the variance of the average offset of a given DUT with respect to the average offset across all of the DUTs may be used to characterize the relative frequency drift of the transmit oscillator of the DUT.

It will be apparent to those of ordinary skill in the art that the techniques used in clock synchronization system 150 may be applicable to a number of OFDM wireless communications technologies, including IEEE 802.11 and Long Term Evolution (LTE). In the case of IEEE 802.11, transmissions may follow the packet format depicted in FIG. 1, and STF/LTF and pilot signal processing may follow the process detailed above. In the case of LTE, the primary and secondary synchronization sequences (PSS and SSS, respectively) may provide the accurate clock synchronization functions of the STF and LTF, while the reference symbols may provide the same functions as the pilot signals.

It will be appreciated by those of ordinary skill in the art that, in accordance with embodiments described herein, the offset compensation derived from pilot signals may be controlled and utilized only when it may provide benefits in clock synchronization. Advantageously, this may significantly increase the stability of the receive clock oscillator and reduce the noise and jitter induced thereto.

It will also be appreciated by those of ordinary skill in the art that, in accordance with aspects of embodiments described herein, the parameters used to process and control the application of offset estimates obtained from pilot signals may be selected according to the source of the received RF signals. This may enable the receiver to adapt the synchronization procedure to the characteristics of individual transmitters and the intervening channels. Advantageously, this may enable the receiver to further improve the stability and jitter of the receive clock oscillator.

It will further be appreciated by those of ordinary skill in the art that, in accordance with yet another aspect of the embodiments described herein, the relative clock drift between different transmitters may be compared by inspecting the corresponding threshold parameters. Advantageously, this may enable simplified assessment of transmit clock oscillator quality.

It will yet further be appreciated by those of ordinary skill in the art that, while these teachings deal in an illustrative sense with digital functions such as numerically controlled oscillators, digital filters, and digital threshold comparators, they may be equally applicable to analog functions such as voltage controlled oscillators, analog filters, and analog threshold comparators. As such, they may provide methods of achieving clock synchronization in the analog domain between receive and transmit carrier oscillators.

Accordingly, while the subject matter herein has been described with reference to illustrative embodiments, this description is not intended to be construed in a limiting sense. Various modifications of the illustrative embodiments, as well as other aspects or embodiments of the subject matter described herein, will be apparent to persons of ordinary skill in the art upon reference to this description. These modifications shall not be construed as departing from the scope of the subject matter described herein, which is defined solely by the claims appended hereto.

What is claimed is:

1. A system for synchronizing a clock of a network equipment test device to received wireless signals and for analyzing relative quality of a plurality of transmit oscillators of a corresponding plurality of wireless devices under test (DUTs), the system comprising:
   a network equipment test device including:
      at least one processor;
      a short training field/long training field (STF/LTF) extraction function implemented by the at least one processor for identifying and for receiving wireless signals from each of said DUTs and for extracting STF and LTF segments from each of said wireless signals;
      a pilot extraction function implemented by the at least one processor for extracting pilot signals from each of said wireless signals;
      an oscillator of said network equipment test device for generating a receive clock signal;
      phase/frequency comparison logic for comparing a phase of each of said pilot signals to a phase of said receive clock signal and generating phase offset estimates based on results of the comparing;
      a phase/frequency error correction function implemented by the at least one processor for modifying the frequency and phase of said oscillator of said network equipment test device according to the STF/LTF and said pilot extraction functions;
      an offset threshold function implemented by the at least one processor for controlled application of pilot-derived offset calculations by said phase/frequency error correction logic, wherein said offset threshold function is operative to prevent said phase/frequency error correction function from utilizing a phase offset estimate generated by said phase/frequency comparison logic from one of said pilot signals to modify the frequency and phase of said oscillator of said network equipment test device when one of said phase offset estimates generated by said phase/frequency comparison logic from said pilot signal does not meet a predetermined threshold and to allow modification of the frequency and phase of said oscillator of said network equipment test device when one of said phase offset estimates generated by said phase/frequency comparison logic from said pilot signal exceeds said predetermined threshold, wherein said offset threshold function is further configured to calculate a running mean and standard deviation over a set of said phase offset estimates, discard phase offset estimates that are outside of a range established by the running mean and standard deviation and thereby prevent utilization of said discarded phase offsets to synchronize said oscillator of said network equipment test device to said pilot signals; and wherein said at least one processor is configured to compute an average of the phase offset estimates computed for the pilot signals for each of the DUTs and to compare the average phase offset of each of the DUTs to the average offset across all of the DUTs to characterize relative frequency drifts of the transmit oscillators of the DUTs.

2. The system of claim 1, wherein said STF and LTF segments are present within the preamble of each of said wireless signals.

3. The system of claim 1, wherein said pilot signals are present within a payload of each of said wireless signals.

4. The system of claim 1, wherein said predetermined threshold is obtained from a parameter storage function.

5. The system of claim 4, wherein said parameter storage function stores a plurality of said predetermined thresholds corresponding to the plurality of DUTs, and retrieves a particular one of said plurality of said predetermined thresholds when receiving a packet from a particular one of said plurality of DUTs.

6. The system of claim 5, wherein said particular one of said plurality of predetermined thresholds is calculated according to signal and channel characteristics of said particular one of said plurality of transmitting stations DUTs.

7. The system of claim 1, wherein said pilot extraction function is adapted to filter said pilot signals according to a predetermined filter criterion.

8. The system of claim 7, wherein said filter criterion is obtained from a parameter storage function implemented by the at least one processor.

9. The system of claim 8, wherein said parameter storage function stores a plurality of filter criteria corresponding to the plurality of DUTs, and retrieves a particular one of said plurality of said filter criteria when receiving a packet from a particular one of said DUTs.

10. A method of synchronizing an oscillator of a network equipment test device to received wireless signals and for analyzing relative quality of a plurality of transmit oscillators of a corresponding plurality of wireless devices under test (DUTs), the method comprising:

in a network equipment test device:
  receiving a plurality of wireless signals from a plurality of DUTs;
  extracting short training field/long training field (STF/LTF) segments and pilot signals from each of said wireless signals;
  initially synchronizing said oscillator of said network equipment test device to said STF/LTF segments;
  calculating a phase offset between a signal output from said oscillator of said network equipment test device and each of said pilot signals and generating a phase offset estimate from each of said pilot signals;
  controlling application of phase offset estimates generated from pilot signals to modify frequency and phase of said oscillator of said network equipment test device by:
    comparing the phase offset estimate generated from each of said pilot signals with a predetermined threshold;
    synchronizing said oscillator of said network equipment test device with said pilot signal in response to said phase offset estimate generated from said pilot signal being greater than said predetermined threshold;
    preventing utilization of said phase offset estimate generated from said pilot signal to synchronize said oscillator of said network equipment test device with said pilot signal if said phase offset estimate generated from said pilot signal does not exceed said predetermined threshold;
    calculating a running mean and standard deviation over a set of said phase offset estimates, discarding phase offset estimates that are outside of a range established by the running mean and standard deviation and thereby preventing utilization of said discarded phase offsets to synchronize said oscillator of said network equipment test device to said pilot signals; and
    computing an average of the phase offset estimates computed for the pilot signals for each of the DUTs and comparing the average phase offset of each of the DUTs to the average offset across all of the DUTs to characterize relative frequency drifts of the transmit oscillators of the DUTs.

11. The method of claim 10, further including filtering a plurality of said offsets according to a filter algorithm, and using said filtered plurality of offsets to synchronize said oscillator of said network equipment test device.

12. The method of claim 11, wherein said filter algorithm is modified according to the DUTs that transmit said wireless signals.

13. The method of claim 10, further including discarding offset values according to a predetermined filter criterion.

14. The method of claim 13, wherein said filter criterion is dependent on a statistical parameter computed over a plurality of said offsets.

15. The method of claim 10, wherein synchronizing said oscillator of said network equipment test device to said pilot signal includes synchronizing said oscillator of said network equipment test device to said pilot signal after a first occurrence of said synchronization to said pilot signal.

16. The method of claim 10, further including calculating said predetermined threshold according to a statistical parameter computed over a plurality of said offsets.

17. The method of claim 10, wherein said predetermined threshold depends on the DUT that transmits each of said wireless signals.

* * * * *

UNITED STATES PATENT AND TRADEMARK OFFICE
CERTIFICATE OF CORRECTION

PATENT NO. : 9,780,988 B2
APPLICATION NO. : 14/058153
DATED : October 3, 2017
INVENTOR(S) : Thomas Alexander et al.

Page 1 of 1

It is certified that error appears in the above-identified patent and that said Letters Patent is hereby corrected as shown below:

In the Claims

In Column 11, Line 27, in Claim 6, after "said plurality of" delete "transmitting stations".

Signed and Sealed this
Third Day of April, 2018

Andrei Iancu
*Director of the United States Patent and Trademark Office*